(12) United States Patent
Poore et al.

(10) Patent No.: US 11,914,158 B2
(45) Date of Patent: Feb. 27, 2024

(54) HEAD-MOUNTED DISPLAY WITH ADJUSTMENT MECHANISM

(71) Applicant: Apple Inc., Cupertino, CA (US)

(72) Inventors: Killian J. Poore, Santa Clara, CA (US); Marinus Meursing, Sunnyvale, CA (US); Jeffrey C. Olson, San Francisco, CA (US); Fletcher R. Rothkopf, Los Altos, CA (US); Jason C. Sauers, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 324 days.

(21) Appl. No.: 17/321,725

(22) Filed: May 17, 2021

(65) Prior Publication Data

US 2021/0271093 A1 Sep. 2, 2021

Related U.S. Application Data

(63) Continuation of application No. 16/118,515, filed on Aug. 31, 2018, now Pat. No. 11,036,054.

(60) Provisional application No. 62/555,143, filed on Sep. 7, 2017.

(51) Int. Cl.
*G02B 27/01* (2006.01)
*G02C 3/00* (2006.01)
*G06F 3/01* (2006.01)

(52) U.S. Cl.
CPC ....... *G02B 27/0176* (2013.01); *G02B 27/017* (2013.01); *G02C 3/003* (2013.01); *G06F 3/012* (2013.01); *G06F 3/013* (2013.01)

(58) Field of Classification Search
CPC .......................... G02B 27/0176; G02B 27/017
See application file for complete search history.

(56) References Cited

U.S. PATENT DOCUMENTS

| 4,672,968 A | 6/1987 | Lenox et al. |
| 4,922,634 A | 5/1990 | Seidel |
| 5,844,530 A | 12/1998 | Tosaki |
| 5,991,085 A | 11/1999 | Rallison et al. |

(Continued)

FOREIGN PATENT DOCUMENTS

| CN | 105392516 A | 3/2016 |
| CN | 106054391 A | 10/2016 |

(Continued)

OTHER PUBLICATIONS fixit.com, "PlayStation VR Teardown", Published Oct. 13, 2016, Downloaded Jul. 15, 2017, https://www.ifixit.com/Teardown/PlayStation+VR+Teardown/69341, 18 pp.

(Continued)

*Primary Examiner* — Joseph P Martinez
(74) *Attorney, Agent, or Firm* — Young Basile Hanlon & MacFarlane, P.C.

(57) ABSTRACT

A head-mounted display to be worn by a user includes a housing, and an eye chamber to be positioned adjacent to eyes of the user. A support assembly includes a headband and an adjustment mechanism that is operable to change fit of the headband relative to the head of the user in response to a control signal, wherein the adjustment mechanism includes a feedback component, and the control signal is generated based on output from the feedback component.

20 Claims, 14 Drawing Sheets

(56) References Cited

U.S. PATENT DOCUMENTS

| | | |
|---|---|---|
| 6,256,798 B1 | 7/2001 | Egolf et al. |
| D738,374 S | 9/2015 | Luckey et al. |
| 9,128,283 B1 | 9/2015 | Heinrich et al. |
| 9,248,040 B2 | 2/2016 | Soderberg et al. |
| D771,625 S | 11/2016 | Sullivan et al. |
| 9,635,450 B2 | 4/2017 | Drinkwater et al. |
| 9,638,921 B2 | 5/2017 | Miller et al. |
| 9,810,911 B2 | 11/2017 | Miller et al. |
| 9,857,596 B2 | 1/2018 | Drinkwater et al. |
| 2013/0335536 A1 | 12/2013 | Kura et al. |
| 2017/0090514 A1 | 3/2017 | Byun et al. |
| 2017/0103573 A1 | 4/2017 | Drinkwater et al. |
| 2017/0277254 A1 | 9/2017 | Osman |
| 2018/0046147 A1* | 2/2018 | Aghara .................. G06F 3/012 |

FOREIGN PATENT DOCUMENTS

| | | |
|---|---|---|
| CN | 106249416 A | 12/2016 |
| CN | 106255916 A | 12/2016 |
| CN | 205910420 U | 1/2017 |
| CN | 205982827 U | 2/2017 |
| CN | 107076995 A | 8/2017 |
| CN | 206421104 U | 8/2017 |
| JP | H05024494 A | 2/1993 |
| JP | H06070380 U | 9/1994 |
| JP | H07234375 A | 9/1995 |
| JP | H08005953 A | 1/1996 |
| JP | H09179061 A | 7/1997 |
| JP | H11202797 A | 7/1999 |
| JP | 2009111512 A | 5/2009 |
| JP | 2017516187 A | 6/2017 |
| KR | 10-2017-0046702 | 5/2017 |
| KR | 10-2017-0069125 A | 6/2017 |
| WO | 2015126987 A1 | 8/2015 |

OTHER PUBLICATIONS fixit.com, "Oculus Rift CV1 Teardown", Published Mar. 30, 2016, Downloaded Jul. 15, 2017, https://www.ifixit.com/Teardown/Oculus+Rift+CV1+Teardown/60612#s126787, 18 pp.

fixit.com, "HTC Vive Teardown", Published Apr. 26, 2016, Downloaded Jul. 15, 2017, https://www.ifixit.com/Teardown/HTC+Vive+Teardown/62213#s130812, 22 pp.

fixit.com, "Razer OSVR HDK 2 Teardown", Published Aug. 10, 2016, Downloaded Jul. 15, 2017, https://www.fixit.com/Teardown/Razer+OSVR+HDK+2+Teardown/65804, 15 pp.

Wikipedia, The Free Encyclopedia, "VFX1 Headgear", Downloaded Jul. 15, 2017, https://en.wikipedia.org/wiki/VFX1_Headgear, 2 pp.

Invitation to Pay Additional Fees and, Where Application, Protest Fee, as issued by the International Searching Authority in co-pending International Application No. PCT/US2018/048998 dated Dec. 12, 2018 (13 pp).

* cited by examiner

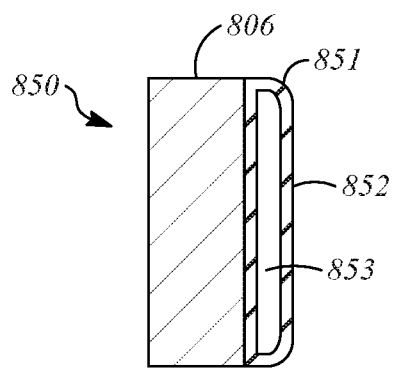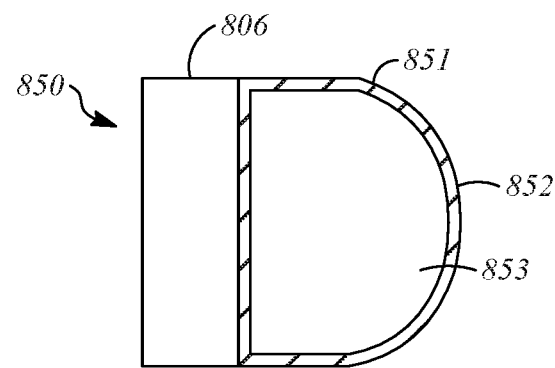
FIG. 8A  FIG. 8B
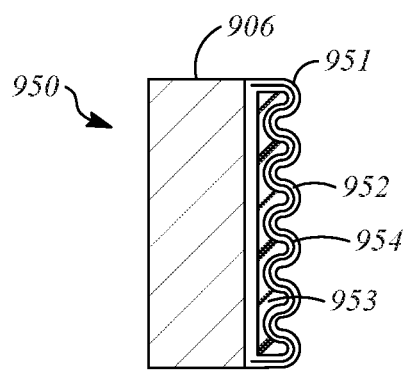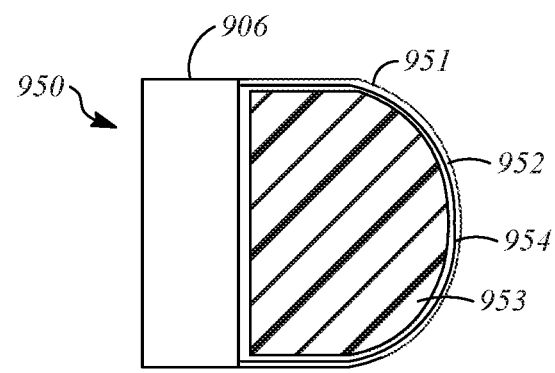
FIG. 9A  FIG. 9B

HEAD-MOUNTED DISPLAY WITH ADJUSTMENT MECHANISM

CROSS-REFERENCE TO RELATED APPLICATIONS

This application is a continuation of U.S. patent application Ser. No. 16/118,515, filed on Aug. 31, 2018, and claims the benefit of U.S. Provisional Application No. 62/555,143, filed on Sep. 7, 2017, the contents of which are hereby incorporated by reference for all purposes.

TECHNICAL FIELD

The application relates generally to adjustable support components for head-mounted displays.

BACKGROUND

Head-mounted displays are worn on a user's head and incorporate an optical display device. Head-mounted displays are typically supported relative to the user's head by a support structure that is connected to the head-mounted display. Examples of support structures include flexible headbands and rigid headbands that extend around or over the user's head. These support structures may include components that allow size adjustment.

SUMMARY

One aspect of the disclosure is a head-mounted display to be worn by a user. The head-mounted display includes a housing and an eye chamber to be positioned adjacent to eyes of the user. A support assembly for the head-mounted display includes a headband and an adjustment mechanism that is operable to change fit of the headband relative to the head of the user in response to a control signal. The adjustment mechanism includes a feedback component, and the control signal is generated based on output from the feedback component.

Another aspect of the disclosure is a head-mounted display to be worn by a user. The head-mounted display includes a housing, an eye chamber to be positioned adjacent to eyes of the user and a support assembly. The support assembly includes a headband and an adjustment mechanism that is operable to change fit of the headband relative to a head of the user, wherein the adjustment mechanism includes a variable volume structure that changes fit of the headband relative to the head of the user by volumetric expansion or volumetric contraction.

Another aspect of the disclosure is a method for adjusting a head-mounted display. The method includes loosening an adjustable headband relative to a housing in response to detecting user contact with a first location and a second location on the housing, and tightening the adjustable headband relative to the housing in response to detecting cessation of user contact with the first location or the second location on the housing.

Another aspect of the disclosure is a head-mounted display to be worn by a user. The head-mounted display includes a housing, an eye chamber to be positioned adjacent to eyes of the user, and a support assembly. The support assembly is configured to extend over a head of the user, has a first portion that is connected to the housing, a second portion that is adjustably connected to the first portion, and a third portion that is adjustably connected to the second portion, wherein the third portion defines a free end for the support assembly that is free from connection to the housing.

BRIEF DESCRIPTION OF THE DRAWINGS

FIG. 8A is a cross-section view showing a pneumatic variable volume adjustment mechanism in a contracted position.

FIG. 8B is a cross-section view showing the pneumatic variable volume adjustment mechanism of FIG. 8A in an expanded position.

FIG. 9A is a cross-section view showing a shape-memory alloy adjustment mechanism in a contracted position.

FIG. 9B is a cross-section view showing the shape-memory alloy adjustment mechanism of FIG. 9A in an expanded position.

DETAILED DESCRIPTION

Head-mounted displays are used by persons having varied head shapes and sizes. Adjustment structures in head-mounted displays may be time consuming to adjust, and finding a comfortable fit may require trial and error by the user. The disclosure herein is directed to head-mounted displays that incorporate passive or active adjustment structures that conform to the shape and size of the user's head without requiring manual adjustment.

Figure 1:
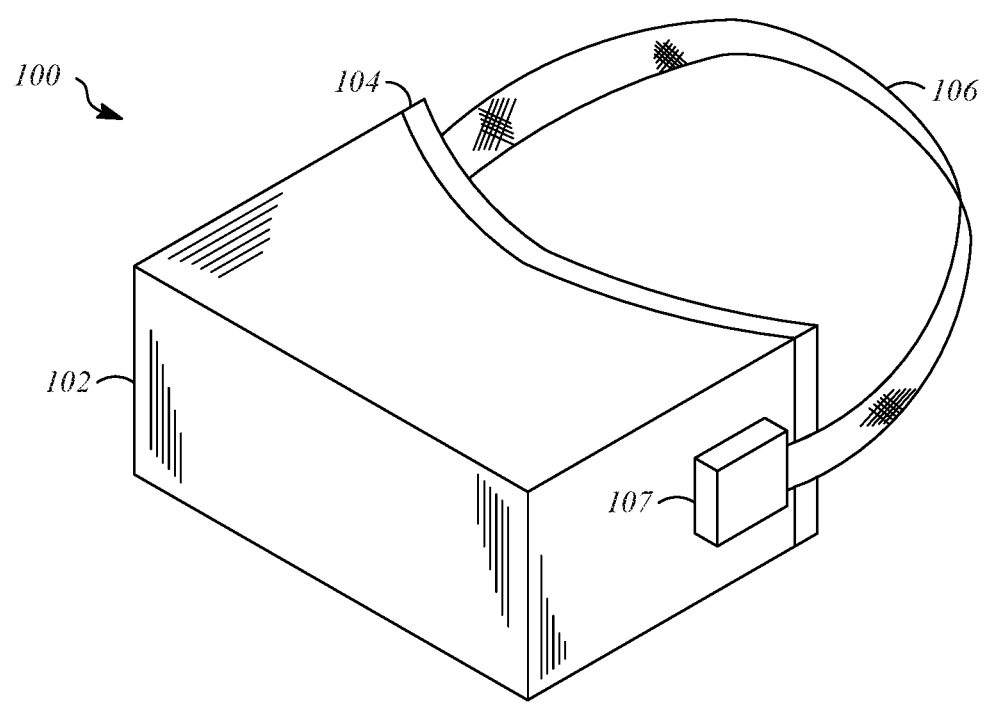
FIG. 1 is a perspective view illustration showing a head-mounted display including a support assembly according to a first example.

FIG. 1 is a perspective view illustration showing a head-mounted display 100. The head-mounted display includes a housing 102, a face seal 104, and support assembly. In this example, the support assembly includes a headband 106 and an adjustment mechanism 107. As will be discussed herein, the support assembly incorporates automatic adjustment features. Portions of the head-mounted display 100 other than the support assembly are shown and described to provide context, and it should be understood that the features described herein can be utilized with head-mounted displays that utilize a broad range of configurations.

The housing 102 may be a single-piece structure or may be a multi-piece structure, and is either rigid or semi-rigid. As will be explained herein, the housing 102 houses components that allow content to be displayed to a user.

The face seal 104 is connected to the housing 102. The face seal 104 is configured to engage and conform to the user's head in the area around the user's eyes. The face seal 104 may function to reduce the amount of light that reaches the user's eyes. The face seal 104 may also function to comfortably engage the housing 102 with the user's head.

The headband 106 is adjustably connected to the housing 102 by the adjustment mechanism 107 and is configured to support the housing 102 relative to the user's head. In the illustrated example, the housing 102 is a generally rectangular structure, and the headband 106 is connected to the lateral sides of the housing 102 to extend peripherally around a user's head. The headband 106 is a flexible or semi-rigid structure, as will be described herein.

Figure 2A:
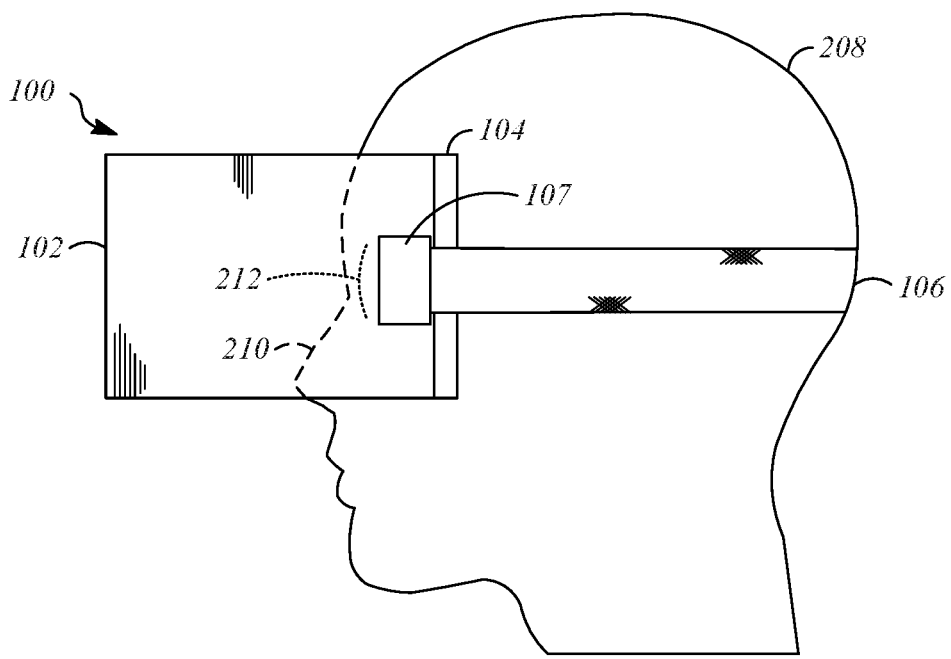
FIG. 2A is a side view showing the head-mounted display of FIG. 1 worn by a user.
Figure 2B:
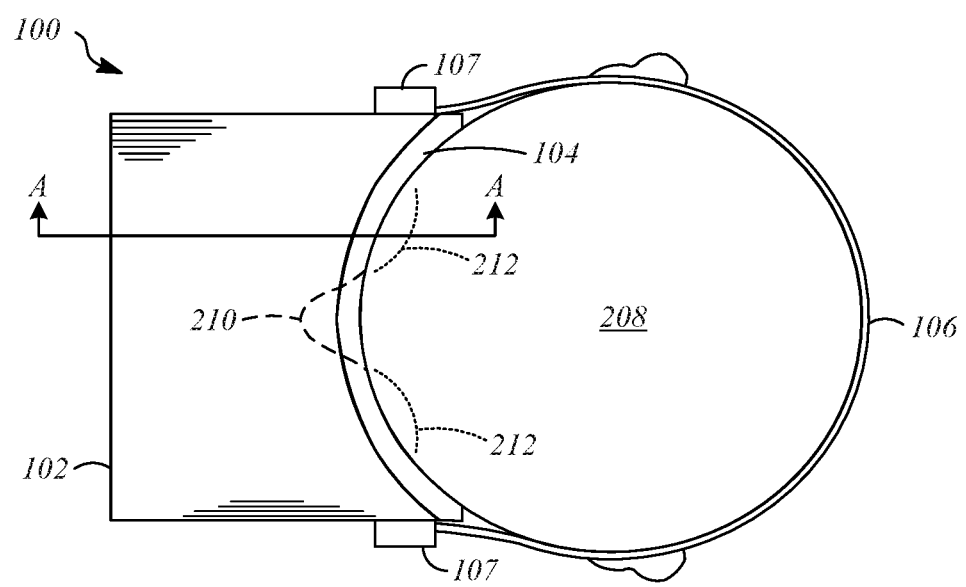
FIG. 2B is a top view showing the head-mounted display of FIG. 1 worn by the user.

FIG. 2A is a side view showing the head-mounted display 100 worn by a user 208, and FIG. 2B is a top view showing the head-mounted display 100 worn by the user 208. The face seal 104 contacts an upper part of the face 210 of the user 208. As an example, the face seal 104 may contact the forehead, the temples, the cheeks, and/or the nose of the user 208, and may extend around the eye area 212 of the user 208.

Figure 3:
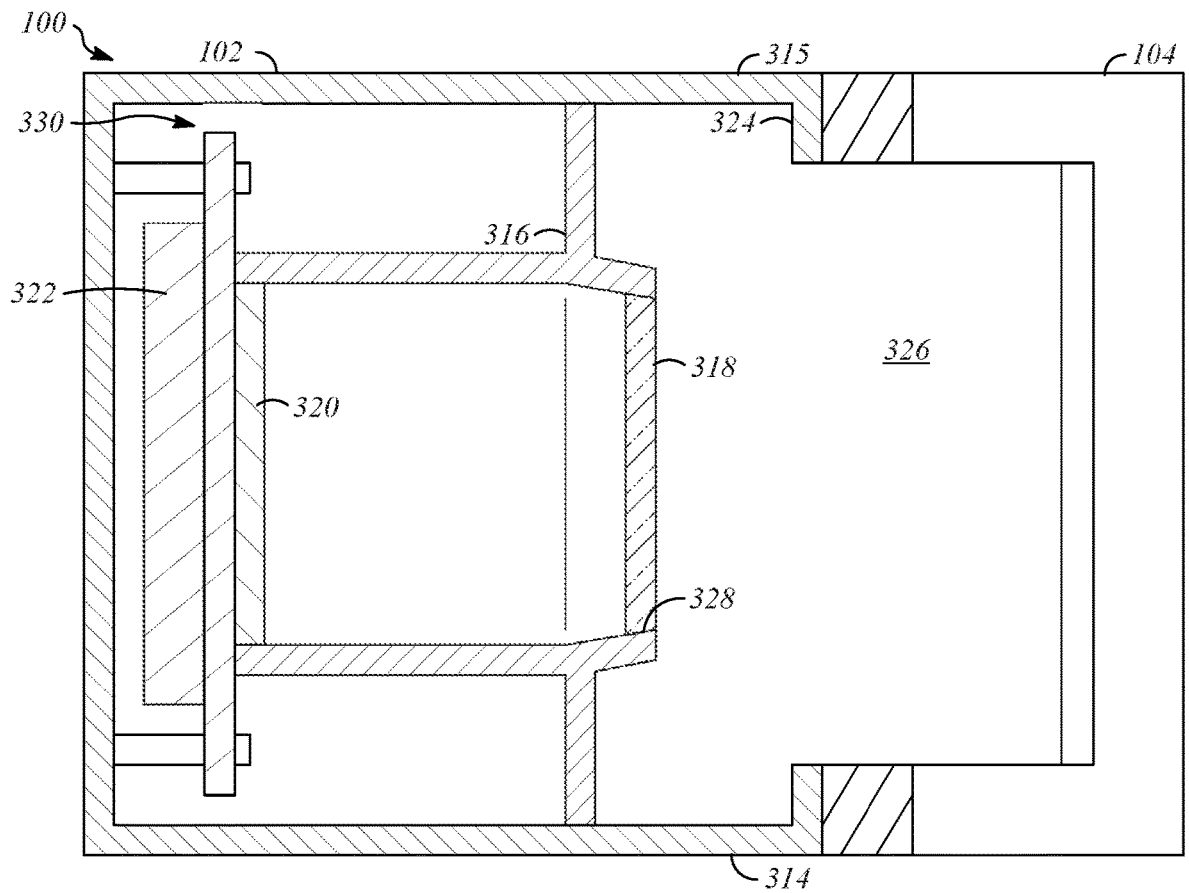
FIG. 3 is a side cross-section view of the head-mounted display of FIG. 1 taken along line A-A of FIG. 2B.

FIG. 3 is a cross-section view of the head-mounted display 100 taken along line A-A of FIG. 2B. The head-mounted display 100 includes the housing 102, which includes a lower wall 314, an upper wall 315, and a divider wall 316. The head-mounted display 100 also includes lenses 318 (e.g. two lenses that are each paired with one of the user's eyes), display devices 320, and electronic components 322. Although two of the display devices 320 are included in the illustrated example, the head-mounted display 100 could instead include a single display device. In addition, although the display devices 320 and the electronic components 322 are shown and described herein as permanently attached components of the head-mounted display 100, they could instead be removable and selectively attachable to the housing 102. For example, a smart phone could be used as the display devices 320 and the electronic components 322, such that the display devices 320 and the electronic components 322 are connectable to the housing 102 or are removably received within the housing.

The housing 102 includes an external structure of the head-mounted display 100 and may include parts of an internal structure of the head-mounted display 100. The housing 102 is connected to the headband 106 (FIGS. 1-2B) or other support structure. Internal spaces of the head-mounted display 100 are defined by the housing 102, in order to support and/or enclose portions of the head-mounted display 100 such as the divider wall 316, the lenses 318, the display devices 320, and the electronic components 322. The housing 102 may be a multi-part structure, or may be a single part structure. The housing 102 may be rigid or semi rigid, and with respect to multi-part structures for the housing 102, may include various portions having differing material properties inclusive of rigid portions and flexible portions.

A front end of the housing 102 includes a peripheral portion 324, which is adjacent to the user 208 when worn. The peripheral portion 324 extends around part or all of the housing 102 at the front end, and provides a support surface or support structure for the face seal 104. Other components and/or structures may be formed on or supported by the peripheral portion 324, such as sensors.

The divider wall 316 has a first side that is exposed the exterior, and is adjacent to an eye chamber 326. The eye chamber 326 is defined within the housing 102 between the divider wall 316 and the face seal 104. When the head-mounted display 100 is worn by the user 208, the eyes of the user 208 are positioned adjacent to the eye chamber 326. By engagement of the face seal 104 with the face 210 of the user 208, the face seal 104 is operable to reduce or eliminate the amount of light from the environment outside the face seal 104 that enters the eye chamber 326. It should be understood, however, that the face seal 104 could be omitted in favor of an open design for the eye chamber 326 that does not exclude light from outside of the head-mounted display 100.

The divider wall 316 may support the lenses 318, either directly or indirectly. In the illustrated example, the lenses 318 are connected to the divider wall 316 and are located in apertures 328 that are formed in the divider wall 316. Other implementations of the head-mounted display 100 may connect the lenses 318 to the divider wall 316 indirectly. As one example, the lenses 318 can be supported by an inter-pupillary distance adjustment mechanism that is operable to move the lenses 318 laterally toward or away from each other. As another example, the lenses 318 can be supported by an eye relief adjustment mechanism that is operable to adjust the position of the lenses 318 in the front-to-rear direction of the housing 102 to change the distance between the eyes of the user 208 and the lenses 318.

The lenses 318 focus, redirect, and reshape the images from the display devices 320 to achieve a desired focal length and other optical properties. The display devices 320 are located in the housing 102 and are oriented such that they emit light (e.g., in patterns that form images) toward the lenses 318. The lenses 318 direct the images emitted by the display devices 320 toward the eyes of the user 208 in a manner that simulates the way the light from a three-dimensional environment reaches the eyes of the user 208. As one example, the lenses 318 may be biconvex lenses. As another example, the lenses 318 may be Fresnel lenses. Focal lengths for the lenses 318 may be, for example, between 25 mm and 50 mm.

On a second side of the divider wall 316, opposite the eye chamber 326, a component chamber 330 is formed between the divider wall 316 and the housing 102. The component chamber 330 is an internal chamber having a substantially enclosed spaced defined by the housing 102 and the divider wall 316. In some implementations, multiple internal chambers are present. In the illustrated example, the display devices 320 and the electronic components 322 are located in the internal chamber. The display devices 320 may be supported by the divider wall 316 (as illustrated), by the housing 102, or by other structures that are located in the component chamber 330.

The electronic components 322 are located in the component chamber 330 and may be supported by the housing 102 or by other structures that are present in the component chamber 330. The electronic components 322 are connected to the display devices 320 and include components that generate or receive content, in the form or signals or data. The content is provided by the display devices to be output for display by the display devices 320 as images defined by emitted light. The electronic components 322 may also include sensors that detect conditions that are relevant to operation of the head-mounted display 100, such as the position and orientation of the head-mounted display 100.

Figure 4:
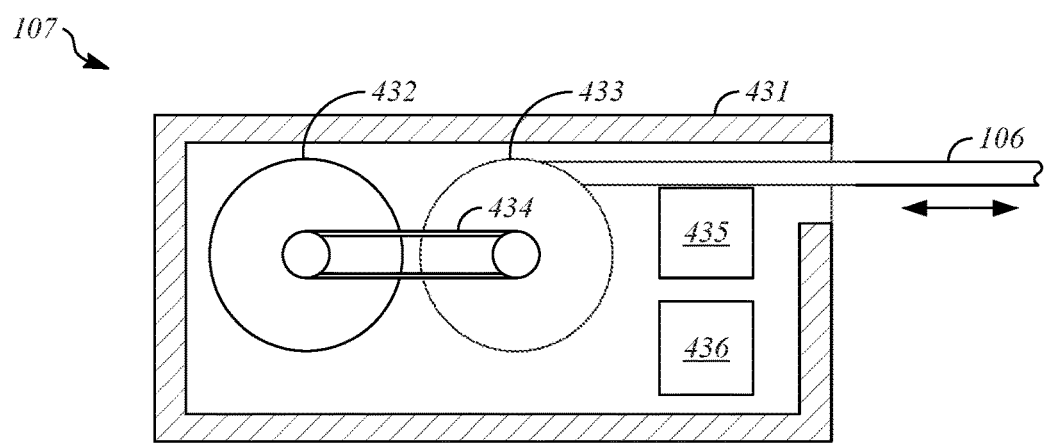
FIG. 4 is an illustration showing an adjustment mechanism of the head-mounted display of FIG. 1.

FIG. 4 is an illustration showing an example of the adjustment mechanism 107 that is connected to the headband 106. The adjustment mechanism 107 is operable to change fit of the headband 106 relative to the head of the user 208 in response to a control signal, as will be described herein. In the illustrated example, the adjustment mechanism 107 includes a housing 431, a motor 432, a spool 433, a drive connection 434, a feedback component 435, and a controller 436.

The motor 432 is an electric motor that is controlled by the controller 436. Any type of electric motor or other actuator may be used to drive loosening and tightening of the headband 106. The spool 433 is connected to the headband 106, which in this example is a flexible member such as a strap. The spool 433 is operable to extend and retract the headband 106 to expand and constrict the fit of the headband 106 relative to the head of the user 208 by changing the length of the headband 106 between the points at which it connects to the housing 102. The spool 433 is connected to the motor 432 by the drive connection 434. The drive connection 434 is any component that interconnects the motor 432 and the spool 433 to cause rotation of the spool 433 in response to rotation by the motor 432 (i.e., at an output shaft of the motor 432). In the illustrated example, the drive connection 434 is a belt drive, but other structures can be used, such as a gear train or a direct connection of the motor 432 to the spool 433. Also, the combination of the motor 432 and the spool 433 is one example of a motor-driven adjustment for a flexible headband, but other mechanisms can be used, such as motor-driven friction rollers that move the headband 106 relative to the housing 431 of the adjustment mechanism.

The feedback component 435 is a sensor (or a group of sensors) that measures the tightness (i.e., fit) of the headband 106 relative to the user 208 and outputs a signal indicating the tightness of the headband 106. The feedback component 435 can, for example, measure tension of the headband 106 either directly or indirectly. As an example of direct measurement, the feedback component 435 may be a tension gauge that is connected to or embedded in the headband 106. As an example of indirect measurement, the feedback component may be a force sensor that is in contact with the headband 106 such as a linear variable differential transformer that measures deflection of a spring-biased post that is in contact with the headband 106. As another example of indirect measurement, the feedback component 435 may be electrically connected to the motor 432 to measure current draw by the motor 432, since current draw is proportional to motor torque, which is related to tightness of the headband 106.

The controller 436 regulates operation of the motor 432 to change the fit of the headband 106 by constricting or expanding the headband 106 relative to the head of the user 208. The controller 436 can be, as examples, a circuit, processor that executes computer program instructions, an application specific integrated circuit, or a field programmable gate array. The controller 436 receives the signal output by the feedback component 435, and may also receive signals from other sources, such as signals that represent user inputs or user actions. The controller 436 is electrically connected to the feedback component an optionally to other components to receive inputs that are used for controlling tightening and loosening of the headband 106.

Based in part on the signal from the feedback component 435, the controller 436 outputs the control signal from causing the motor 432 to constrict or expand the headband 106. As an example, the controller 436 may cause the motor 432 to tighten the headband 106 when the signal from the feedback component 435 (e.g., representing strap tension), is below a threshold value, and the controller 436 may cause the motor 432 to stop tightening the headband 106 or to loosen the headband 106 when the signal from the feedback component 435 is above the threshold value.

In some implementations, a user-operated control device, such as a knob, is provided to allow manual control of the fit adjustment. The user-operated input device can change tightness by moving the components of the headband 106 in correspondence to an amount by which the control is displaced (i.e., tightening or loosening proportional to degrees by which the knob is rotated), or the user-operated input device can control speed based on angular displacement relative to a neutral position. The rate at which the headband 106 is loosened or tightened can be adjusted based on the current size of the headband 106 relative to the size of the user's head (e.g., detected by a camera or a proximity sensor), such that the same magnitude of user input causes larger amounts of loosening and tightening when the difference between the current size of the headband 106 and the user's head is large.

The head-mounted display 100 can be implemented using a single one of the adjustment mechanisms 107, by connecting a first side of the headband 106 to the housing 102 using the adjustment mechanism 107 and using a fixed connection of a second side of the headband 106 to the housing 102. The head-mounted display 100 can be implemented using a single one of the adjustment mechanisms 107, by connecting a first and second sides of the headband 106 to the housing 102 using fixed connections and by positioning one or more of the adjustment mechanisms 107 along the headband 106, such as at locations along the sides of the user's head or at a location behind the user's head. The head-mounted display 100 can be implemented using two of the adjustment mechanisms 107, by connecting each of the first side and the second side of the headband 106 to the housing 102 using a respective one of the adjustment mechanisms 107. In some implementations, the headband 106 includes an additional strap that extends over the head of the user in addition to a peripheral strap, and a third one of the adjustment mechanisms 107 may be used to adjustable connect this strap to the housing 102.

Figure 5A:
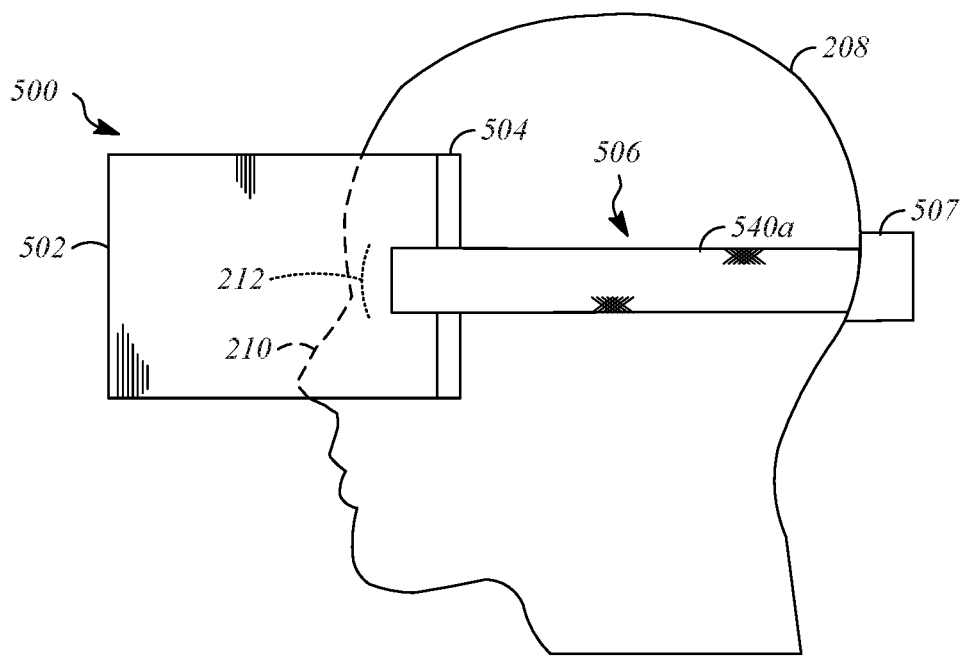
FIG. 5A is a side view showing a head-mounted display including a support assembly according to a second example worn by the user.
Figure 5B:
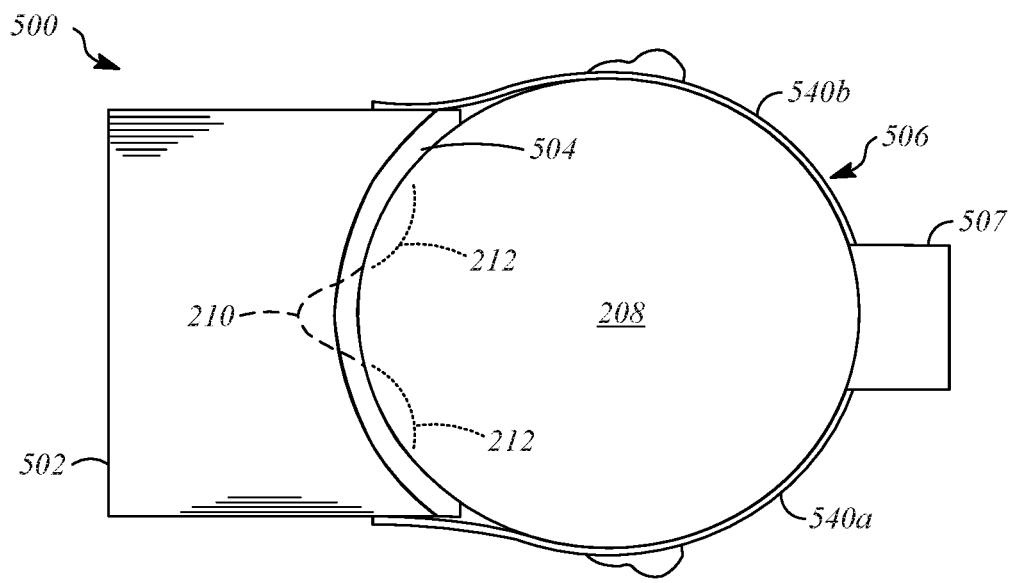
FIG. 5B is a top view showing the head-mounted display of FIG. 5A worn by the user.

FIGS. 5A-5B are illustrations that shows a head-mounted display 500 having an adjustable support assembly according to another example in a side view (FIG. 5A) and a top view (FIG. 5B). The head-mounted display 500 may include the components described with respect to the head-mounted display 100, and those components can be configured in the same manner and function in the same manner except as otherwise described herein.

The head-mounted display 500 includes a housing 502 that contains components as described with respect to the head-mounted display 100 for presenting content to the user 208. The head-mounted display 500 can be supported relative to the head of the user 208 by a support assembly that includes a headband 506 and an adjustment mechanism 507.

The headband 506 includes a first band portion 540a and a second band portion 540b, each or which are connected to a respective side of the housing 502. The first band portion 540a and the second band portion 540b may be rigid or semi-rigid structures. In some implementations, such as when the first band portion 540a and the second band portion 540b are rigid components, passive compliant structures such as joints, slides, elastic members, clutches, or slip faces may be incorporated in the headband 506 to prevent overtightening.

Figure 6:
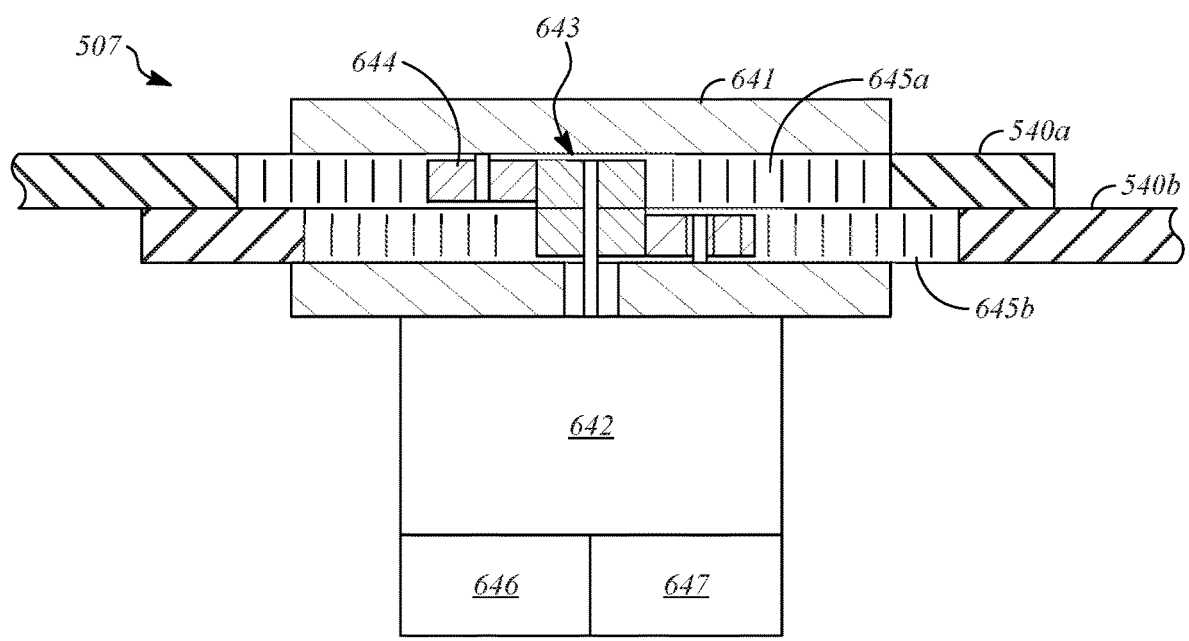
FIG. 6 is top view cross-section illustration showing an adjustment mechanism of the head-mounted display of FIG. 5A.

The adjustment mechanism 507 interconnects the first band portion 540a and the second band portion 540b in a manner that allows the fit of the headband 506 to be changed by constricting or expanding the headband 506. As shown in FIG. 6, the adjustment mechanism 507 includes a housing 641, a motor 642, and a gear rack assembly 643 that interconnects the first band portion 540a and the second band portion 540b. The gear rack assembly 643 includes a gear train 644 that is rotated by the motor 642. The motor 642 and the gear train 644 are connected to the housing 641 in a manner that restrains translation relative to the housing 641. The gear rack assembly 643 is engaged with gear teeth that are formed on either or both of the first band portion 540a and the second band portion 540b. Interconnection of the first band portion 540a and the second band portion 540b by the gear rack assembly 643 allows the headband 506 to be loosened or tightened by movement of the first band portion 540a relative to the second band portion 540b in response to operation of the motor 642.

In the illustrated example, first gear teeth 645a are formed on the first band portion 540a, and second gear teeth 645b are formed on the second band portion 540b. Rotation of the gear train 644 translates the first band portion 540a and the second band portion 540b relative to the housing 641, while keeping equal lengths for the first band portion 540a relative to the second band portion 540b between the housing 641 of the adjustment mechanism 507 and the housing 502 of the head-mounted display 500. Alternatively, the first gear teeth 645a may be provided on the first band portion 540a while the second gear teeth 645b are omitted from the second band portion 540b, with the second band portion 540b instead being connected to the housing 641 of the adjustment mechanism 507 in manner that does not include translation of the adjustment mechanism 507 relative to the second band portion.

The adjustment mechanism 507 may include a feedback component 646 and a controller 647 that control tightening and loosening of the headband 506 in the same manner described in connection with the adjustment mechanism 107.

In the illustrated example, the support assembly of the head-mounted display 500 is connected to the housing 502 in a "goggles" style configuration in which the support assembly is connected to the sides of the housing 502 and the head-mounted display 500 is supported in part through contact of the user's face with a face seal 504 of the head-mounted display. Alternatively, the support assembly could be implemented using a "halo" style configuration in which the support assembly contacts the user's forehead, and is connected to the top of the housing 502 such that the housing 502 is suspended from the support assembly.

Figure 7A:
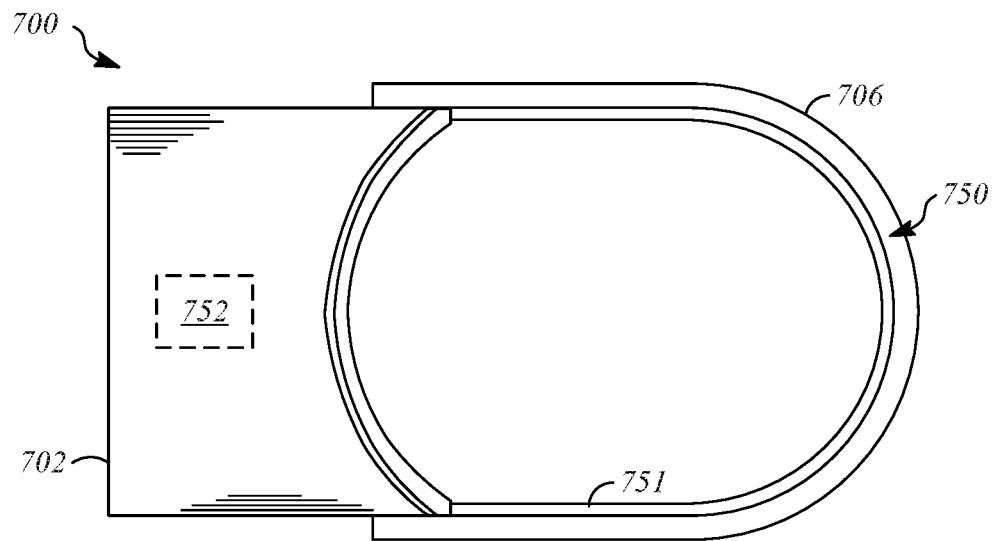
FIG. 7A is a top view showing a head-mounted display including a support assembly having a variable volume adjustment mechanism, with the variable volume adjustment mechanism in a contracted position.
Figure 7B:
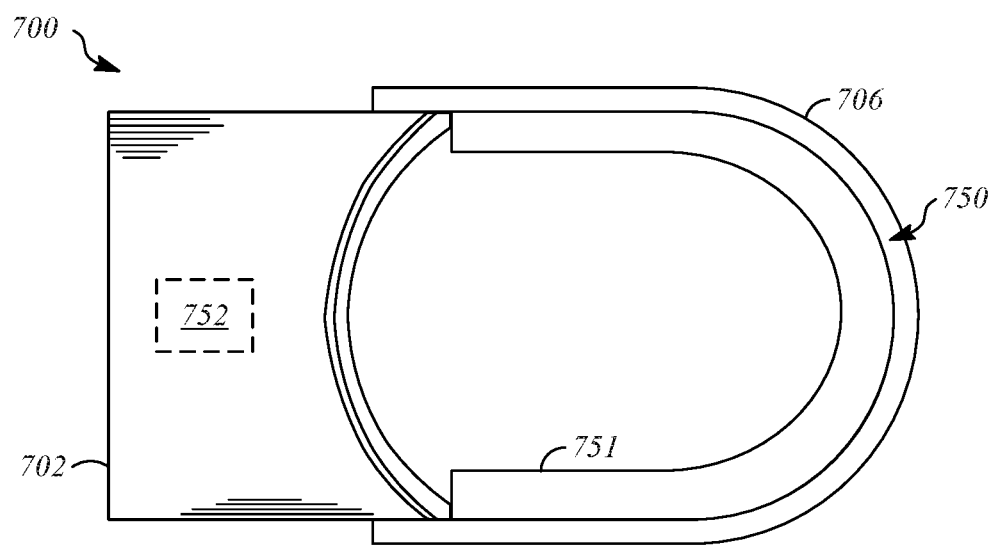
FIG. 7B is a top view showing a head-mounted display of FIG. 7A with the variable volume adjustment mechanism in an expanded position.

FIGS. 7A-7B are top view illustrations showing a head-mounted display 700 including a support assembly having a variable volume adjustment mechanism 750, with the variable volume adjustment mechanism 750 in a contracted position (FIG. 7A) and with the variable volume adjustment mechanism 750 in an expanded position (FIG. 7B). The head-mounted display 700 may include the components described with respect to the head-mounted display 100, and those components can be configured in the same manner and function in the same manner except as otherwise described herein.

The head-mounted display 700 includes a housing 702 and a headband 706 that is connected to the housing 702. The variable volume adjustment mechanism 750 includes a variable volume structure 751 that changes fit of the headband 706 relative to the head of the user by volumetric expansion or volumetric contraction. The variable volume structure 751 is located on an interior surface of the headband 706, so that it engages the head of the user when worn. The variable volume structure 751 may be, as examples, an electrical, hydraulic, or pneumatic device that is able to expand and contract in a controllable manner (e.g., in response to supply of a signal or a fluid to the variable volume structure 751. Expansion and contraction of the variable volume structure 751 is regulated by a control system 752, which may be, as examples, an electrical, hydraulic, or pneumatic control device that is operable to cause and control expansion and contraction of the variable volume structure 751.

FIG. 8A is a cross-section view showing a pneumatic variable volume adjustment mechanism 850 in a contracted position, and FIG. 8B is a cross-section view showing the pneumatic variable volume adjustment mechanism 850 in an expanded position. The pneumatic variable volume adjustment mechanism 850 can be used in place of the variable volume adjustment mechanism 750 in the head-mounted display 700. The pneumatic variable volume adjustment mechanism 850 is connected to a headband 806 and includes a variable volume structure 851 that has a cover 852 and one or more internal bladders 853. Air is supplied to the internal bladders 853 to inflate them and move the variable volume structure 851 from the contracted position to the expanded position. Air is released to return to the contracted position. Air can be supplied and released by a control system, as described with respect to the control system 752.

FIG. 9A is a cross-section view showing a shape-memory alloy adjustment mechanism 950 in a contracted position, and FIG. 9B is a cross-section view showing the shape-memory alloy adjustment mechanism 950 in an expanded position. The shape-memory alloy adjustment mechanism 950 can be used in place of the variable volume adjustment mechanism 750 in the head-mounted display 700. The shape-memory alloy adjustment mechanism 950 is connected to a headband 906 and includes a variable volume structure 951 that has a cover 952 and a compressible material 953 (e.g. open cell foam). Shape-memory alloy wires 954 (i.e., "muscle wires") are embedded in the cover 952 and move between the contracted and expanded positions in response to changes in supply of electrical current, to compress the compressible material 953 in the contracted position and to allow expansion of the compressible material 953 in the expanded position. Supply of current can be regulated by a control system, as described with respect to the control system 752.

Figure 10A:
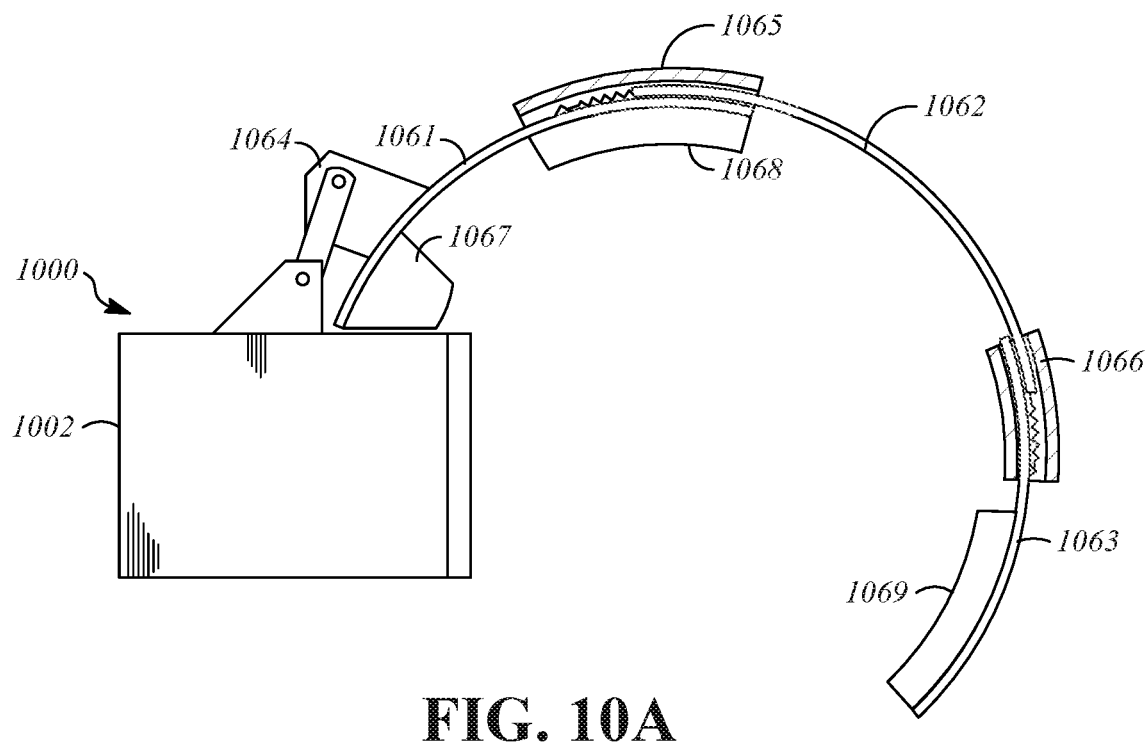
FIG. 10A is a side view showing a head-mounted display including a support assembly according to another example.
Figure 10B:
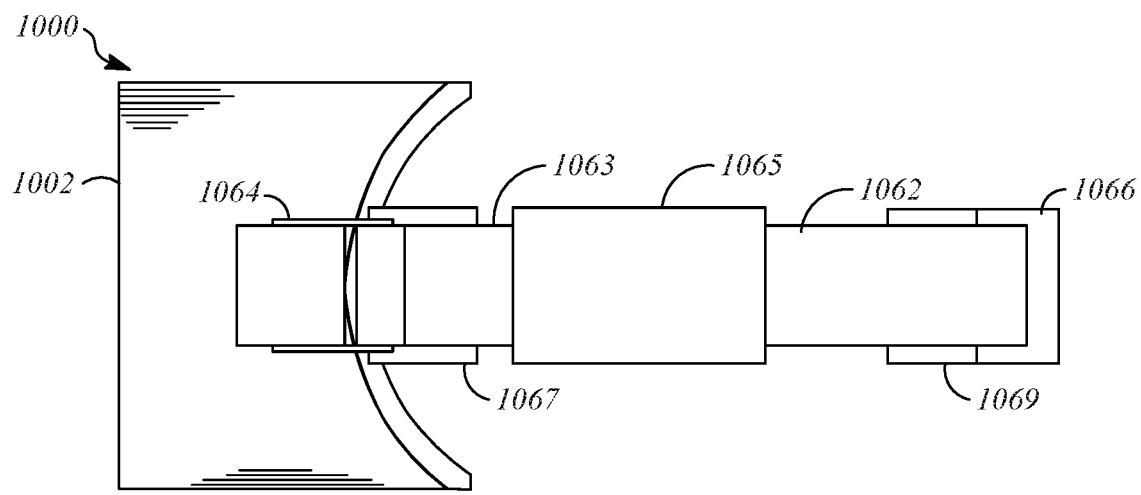
FIG. 10B is a top view showing the head-mounted display of FIG. 10A.

FIGS. 10A-10B are illustrations that shows a head-mounted display 1000 having an adjustable support assembly according to another example in a side view (FIG. 10A)

and a top view (FIG. 10B). The head-mounted display 1000 may include the components described with respect to the head-mounted display 100, and those components can be configured in the same manner and function in the same manner except as otherwise described herein.

The head-mounted display 1000 includes a housing 1002 that contains components as described with respect to the head-mounted display 100 for presenting content to the user. The head-mounted display 1000 can be supported relative to the head of the user by a support assembly that includes a headband 1006. The headband 1006 is configured to extend over a head of the user, and includes a first band portion 1061, a second band portion 1062, and a third band portion 1063. The first band portion 1061 is connected to the housing 1002 by a mounting bracket 1064 that is connected to a top surface of the housing 1002 such that the housing 1002 is suspended from the first band portion 1061. The second band portion 1062 is adjustably connected to the first band portion 1061. The third band portion 1063 is adjustably connected to the second band portion 1062 and defines a free end for the support assembly that is free from connection to the housing 1002. In use, the head of the user is positioned between the housing 1002 and the free end of the third portion of the housing 1002.

In the illustrated implementation, adjustment of the support assembly is passive, utilizing mechanical components that do not include electrical control. The first band portion 1061 is connected to the second band portion 1062 by a first spring-biased joint 1065 that defines a spring-biased sliding connection between the first band portion 1061 and the second band portion 1062 to constrict until expanded by the user. The second band portion 1062 of the support assembly is connected to the third portion 1063 of the support assembly by a second spring biased joint 1066 that defines a spring-biased sliding connection between the second band portion 1062 and the third band portion 1063 to constrict until expanded by the user.

To engage the head of the user, the support assembly includes a first cushion pad 1067, a second cushion pad 1068, and a third cushion pad 1069. The first cushion pad 1067 is connected to the support assembly near the housing 1002. The second cushion pad 1068 is connected to the support assembly between the housing 1002 and the free end of the support assembly, to engage a top portion of the head of the user. The third cushion pad 1069 is located near the free end of the support assembly. As an example, the first cushion pad 1067 may be connected to the first band portion 1061 for engagement with a front portion of the head of the user, the second cushion pad 1068 may be connected to the second band portion 1062 for engagement with the top portion of the head of the user, the third cushion pad 1069 may be connected to the third band portion 1063 for engagement with a rear portion of the head of the user.

Figure 11A:
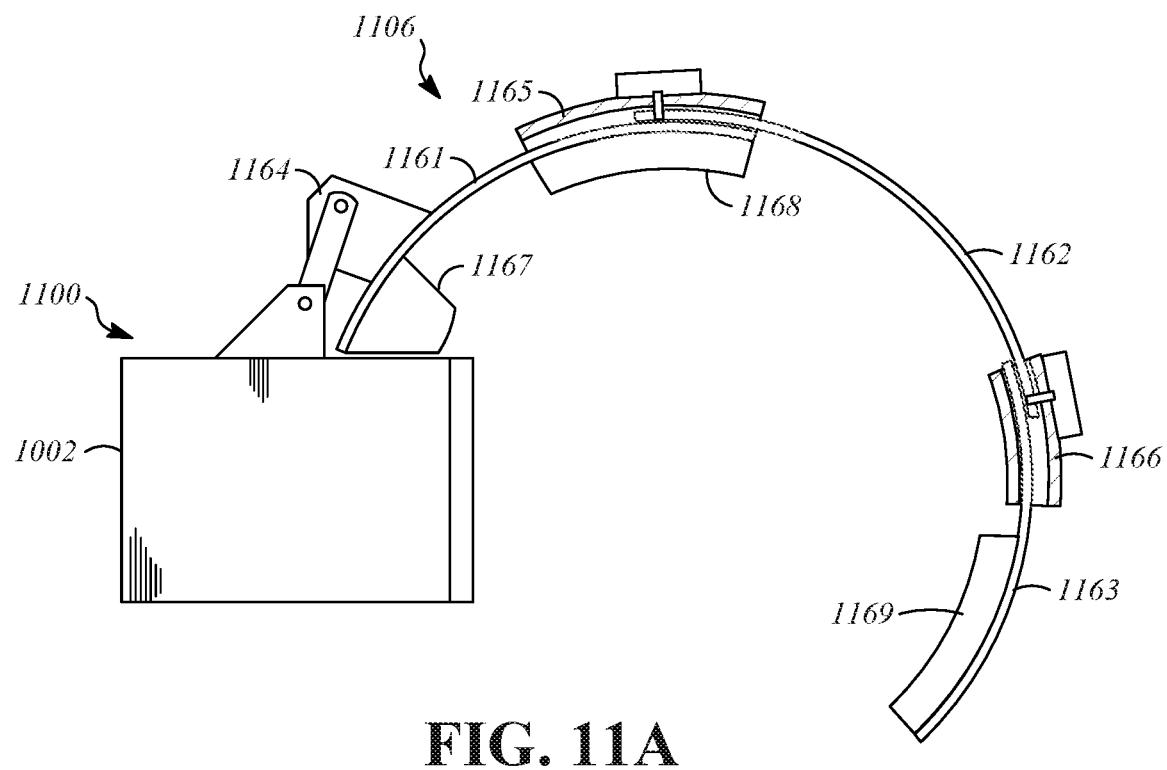
FIG. 11A is a side view showing a head-mounted display including a support assembly according to another example.
Figure 11B:
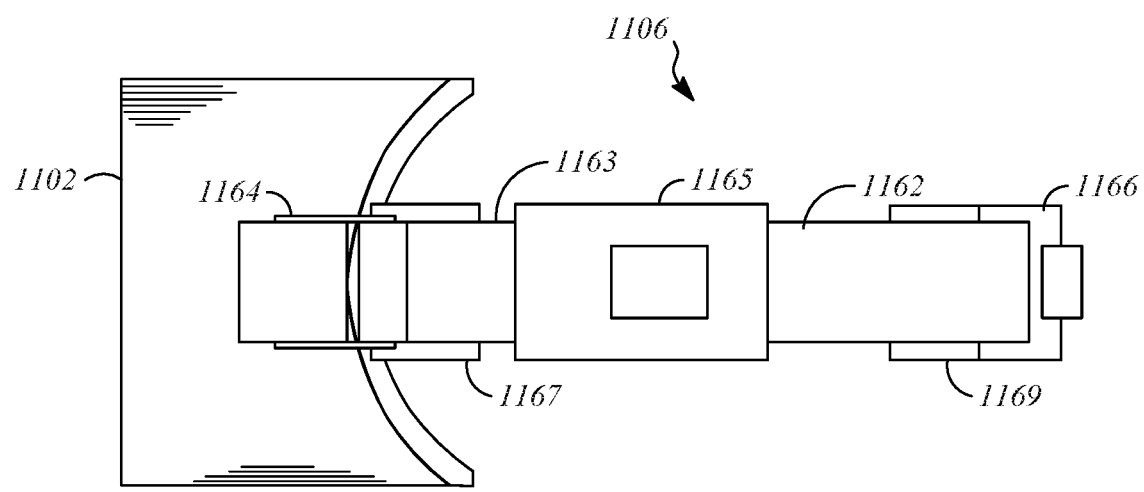
FIG. 11B is a top view showing the head-mounted display of FIG. 11A.

FIGS. 11A-11B are illustrations that show a head-mounted display 1100 having an adjustable support assembly according to another example in a side view (FIG. 11A) and a top view (FIG. 11B). The head-mounted display 1100 may include the components described with respect to the head-mounted display 100, and those components can be configured in the same manner and function in the same manner except as otherwise described herein.

The head-mounted display 1100 includes a housing 1102 that contains components as described with respect to the head-mounted display 100 for presenting content to the user. The head-mounted display 1100 can be supported relative to the head of the user by a support assembly that includes a headband 1106. The headband 1106 is configured to extend over a head of the user, has a first band portion 1161, a second band portion 1162, and a third band portion 1163. The first band portion 1161 is connected to the housing 1102 by a mounting bracket 1164 that is connected to a top surface of the housing 1102 such that the housing 1102 is suspended from the first band portion 1161. The second band portion 1162 is adjustably connected to the first band portion 1161. The third band portion 1163 is adjustably connected to the second band portion 1162, and defines a free end for the support assembly that is free from connection to the housing 1102. In use, the head of the user is positioned between the housing 1102 and the free end of the third portion of the housing 1102.

In the illustrated implementation, adjustment of the support assembly is actively controlled, for example, using a control signal based on a feedback signal, and can include a controller and feedback components as discussed with respect to other examples. The first band portion 1161 is connected to the second band portion 1162 by a first motorized sliding joint 1165 that defines a controllable sliding connection between the first band portion 1161 and the second band portion 1162 to constrict and expand in response to a control signal. The second band portion 1162 of the support assembly is connected to the third band portion 1163 of the support assembly by a second motorized sliding joint 1166 that defines a controllable sliding connection between the second band portion 1162 and the third band portion 1163 to constrict and expand in response to a control signal.

The first motorized sliding joint 1165 and the second motorized sliding joint 1166 can each incorporate electric motors and a mechanical interconnection such as a gear rack that causes relative motion of the interconnected parts in response to operation of the electric motor. The first motorized sliding joint 1165 and the second motorized sliding joint 1166 could alternatively be controlled by a single electric motor connected to the joints by tension wires or other mechanical components. For example, tension wires could be used to constrict the first motorized sliding joint 1165 and the second motorized sliding joint 1166 in opposition to biasing forces applied by springs at each of the joints.

To engage the head of the user, the support assembly includes a first cushion pad 1167, a second cushion pad 1168, and a third cushion pad 1169. The first cushion pad 1167 is connected to the support assembly near the housing 1102. The second cushion pad 1168 is connected to the support assembly between the housing 1102 and the free end of the support assembly, to engage a top portion of the head of the user. The third cushion pad 1169 is located near the free end of the support assembly. As an example, the first cushion pad 1167 may be connected to the first band portion 1161 for engagement with a front portion of the head of the user, the second cushion pad 1168 may be connected to the second band portion 1162 for engagement with the top portion of the head of the user, the third cushion pad 1169 may be connected to the third band portion 1163 for engagement with a rear portion of the head of the user.

Figure 12:
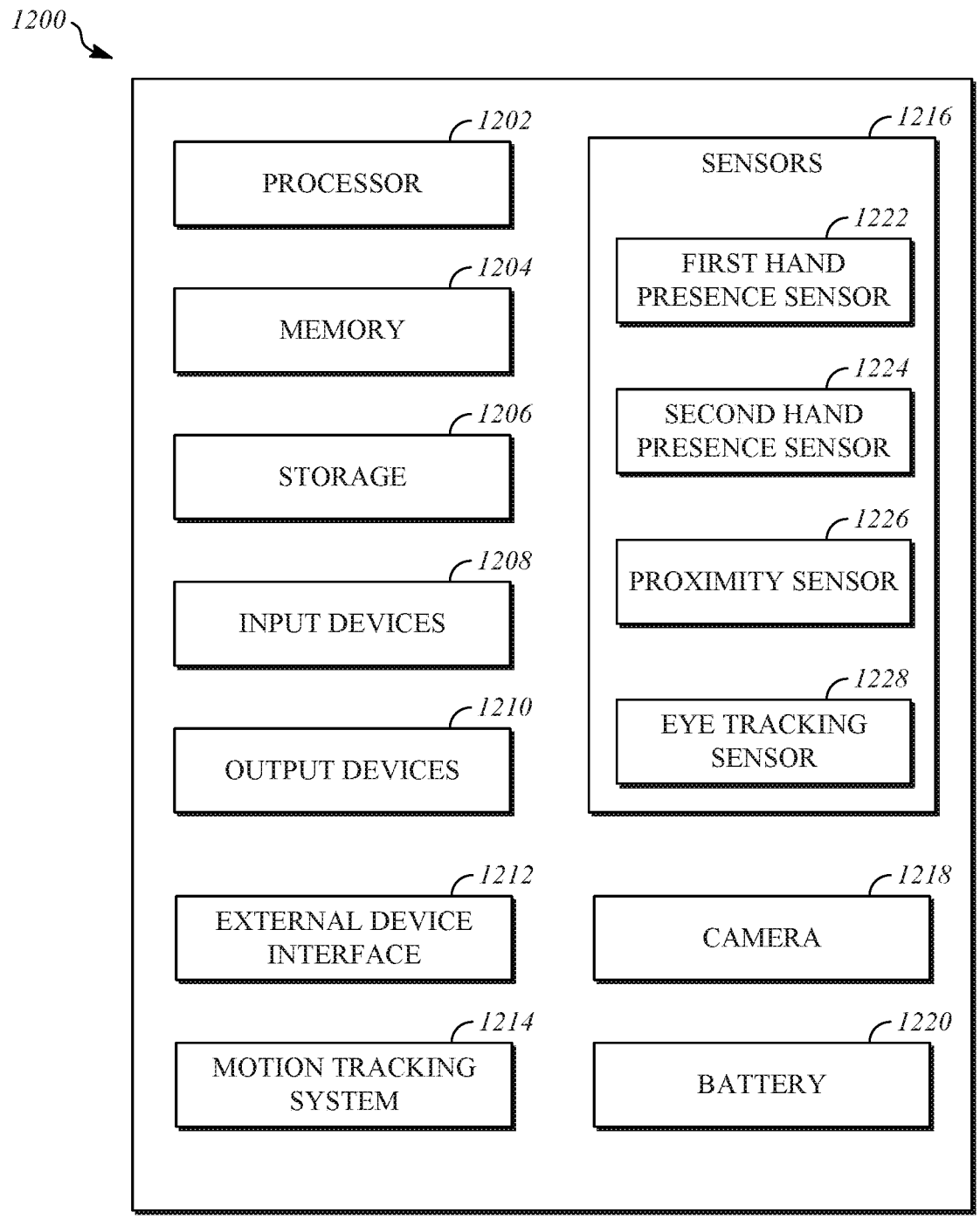
FIG. 12 is a block diagram that shows an example of a hardware configuration for electronic components of a head-mounted display.

FIG. 12 is a block diagram that shows an example of a hardware configuration for the electronic components 1200 of the head-mounted display 100. In the illustrated example, the electronic components 1200 include a processor 1202, memory 1204, storage 1206, input devices 1208, output devices 1210, an external device interface 1212, a motion tracking system 1214, sensors 1216, a camera 1218, and a battery 1220. In some embodiments, some or all of the electronic components 1200 are implemented as a system on a chip.

The processor 1202 is operable to execute computer program instructions and perform operations described by the computer program instructions. As an example, the processor 1202 may be a conventional device such as a central processing unit. The memory 1204 may be a volatile, high-speed, short-term information storage device such as a random-access memory module. The storage 1206 may be a non-volatile information storage device such as a hard drive or a solid-state drive. The input devices 1208 may include any type of human-machine interface such as buttons, switches, motion sensitive controllers, a keyboard, a mouse, a touchscreen input device, a gestural input device, or an audio input device (e.g., a microphone). The output devices 1210 may include any type of device operable to provide an indication to a user regarding an operating state, such as the display devices 320 of the head-mounted display 100, or an audio output device (e.g., speakers).

The external device interface 1212 is a wired or wireless interface using any type of protocol. As one example, the external device interface 1212 may include a wired connection to an external computing device that is utilized to generate content, such as content that is displayed by the display devices 320 of the head-mounted display 100, such as by rendering the content. As another example, the external device interface 1212 can allow wireless connection to internet access to utilize server-based resources during operation of the head-mounted display 100.

The motion tracking system 1214 can detect three axis rotations and accelerations of the head-mounted display 100, and provide this information as inputs to the processor 1202 or to other systems. As an example, information output by the motion tracking system 1214 can be utilized to implement view tracking in certain software applications, and the information output by the motion tracking system 1214 can be used by the software application during generation of content. The motion tracking system 1214 can include, for example, an inertial measuring unit that utilizes accelerometers, gyroscopes, and magnetometers to output information that describes motion. The motion tracking system can also include other types of motion tracking technologies, such as structured-light stereo devices, depth cameras, LIDAR devices, radar devices, ultrasonic devices, infrared detectors that measure signals from external infrared sources, and infrared beacons that emit signals that can be measured by external infrared detectors.

The sensors 1216 various types of sensors in addition to those in the motion tracking system. Examples include biometric sensors, temperature sensors, light sensors and force sensors. Some of the sensors 1216 may be included in other components. For example, a temperature sensor may be incorporated in the processor 1202. Particular examples of sensors that are included in the sensors 1216 are a first hand presence sensor 1222 and a second hand presence sensor 1224 that utilize electromechanical (e.g., physical switch) or electrical (e.g., capacitance signal) sensing to detect that the user is holding the device in locations such as first and second side surfaces of a housing. A proximity sensor 1226 may be located in an eye chamber of a device to determine whether the user's face is positioned adjacent to the eye chamber. An eye tracking sensor 1228 (e.g., using infrared cameras located in an eye chamber of a device) may be provided to measure the location and gaze angle of the user's eyes.

The camera 1218, which can include a single camera or multiple cameras, can be included to capture video of the environment surrounding the head-mounted display 100 or can be used to sense features in the environment or features of the user. As one example, the camera 1218 can be mounted in an eye chamber of a head-mounted display and used for eye tracking, such as in the eye chamber 326 of the head-mounted display 100.

The battery 1220 supplies electrical power to various components of the head-mounted display 100, including the electronic components 1200. As an example, the battery 1220 can be a rechargeable battery of any suitable type.

Figure 13:
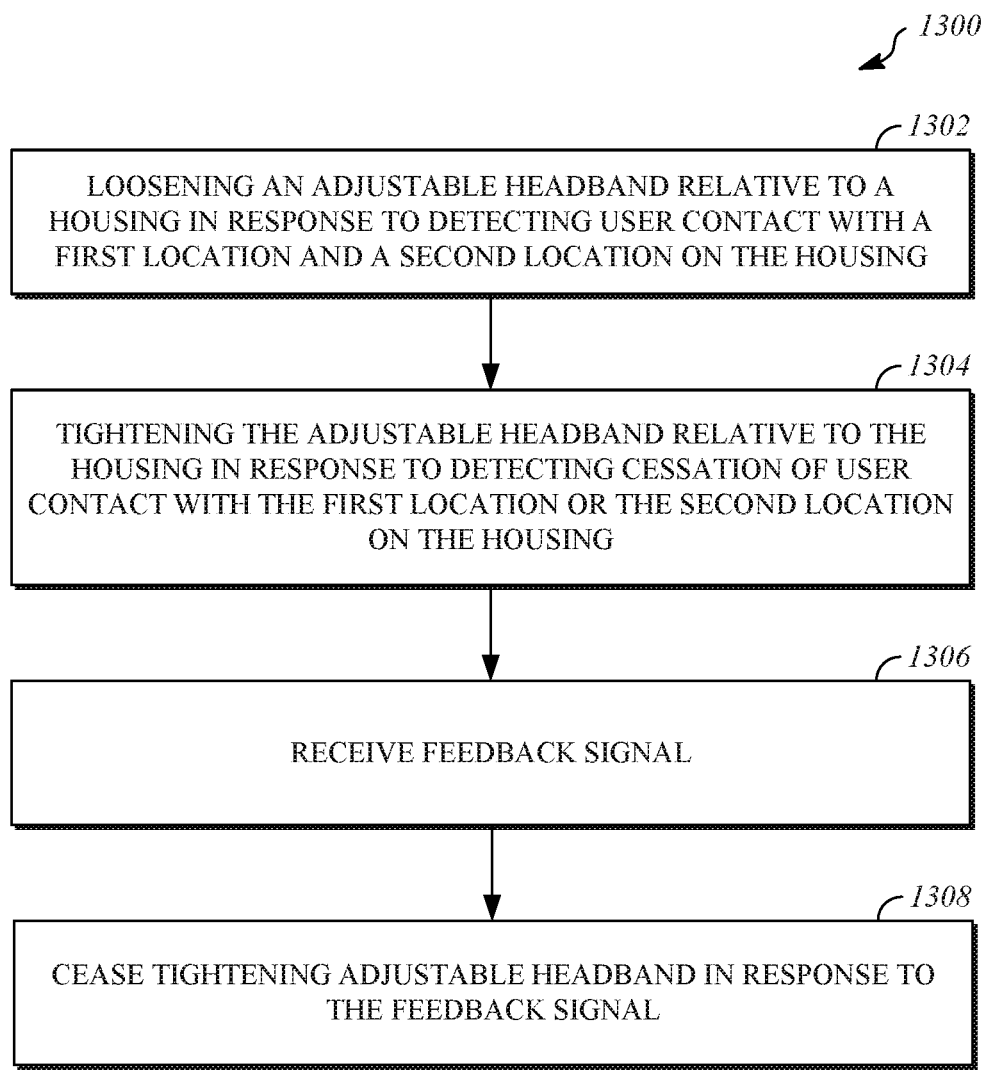
FIG. 13 is a flowchart showing a first example of a process for adjusting a head-mounted display.

FIG. 13 is a flowchart that shows a first example of a process 1300 for adjusting a head-mounted display. In the process 1300, tightening and loosening of the adjustable headband is controlled based on contact of a user's hands with the head-mounted display, such that the head-mounted display is loosened when both hands are present and tightened when one or both hands are removed from the head-mounted display. The process 1300 can be implemented, for example, using the head-mounted display 100, the head-mounted display 500, the head-mounted display 700, the head-mounted display 1000, and the head-mounted display 1100. The process 1300 may also be implemented using the electronic components 1200. Some of the operations are performed using a computing device. One example of a computing device includes a processor, a memory, and computer-executable program instruction that are stored in the memory and can be executed by the processors to perform the operations that are described herein. The computing device may include the processor 1202 and the memory 1204 of the electronic components 1200.

Operation 1302 includes loosening an adjustable headband relative to a housing in response to detecting user contact with a first location and a second location on the housing. The first location and the second location may be, for example, the positions of the first hand presence sensor 1222 and the second hand presence sensor 1224, such as on left and right lateral sides of a housing of the head-mounted display (e.g., the housing 102 of the head-mounted display 100). Operation 1304 includes tightening the adjustable headband relative to the housing in response to detecting cessation of user contact with the first location or the second location on the housing. In operation 1306, a feedback signal is received, indicating that the adjustable headband has been tightened appropriately. In operation 1308, in response to the feedback signal received in operation 1306, tightening of the adjustable headband ceases.

Figure 14:
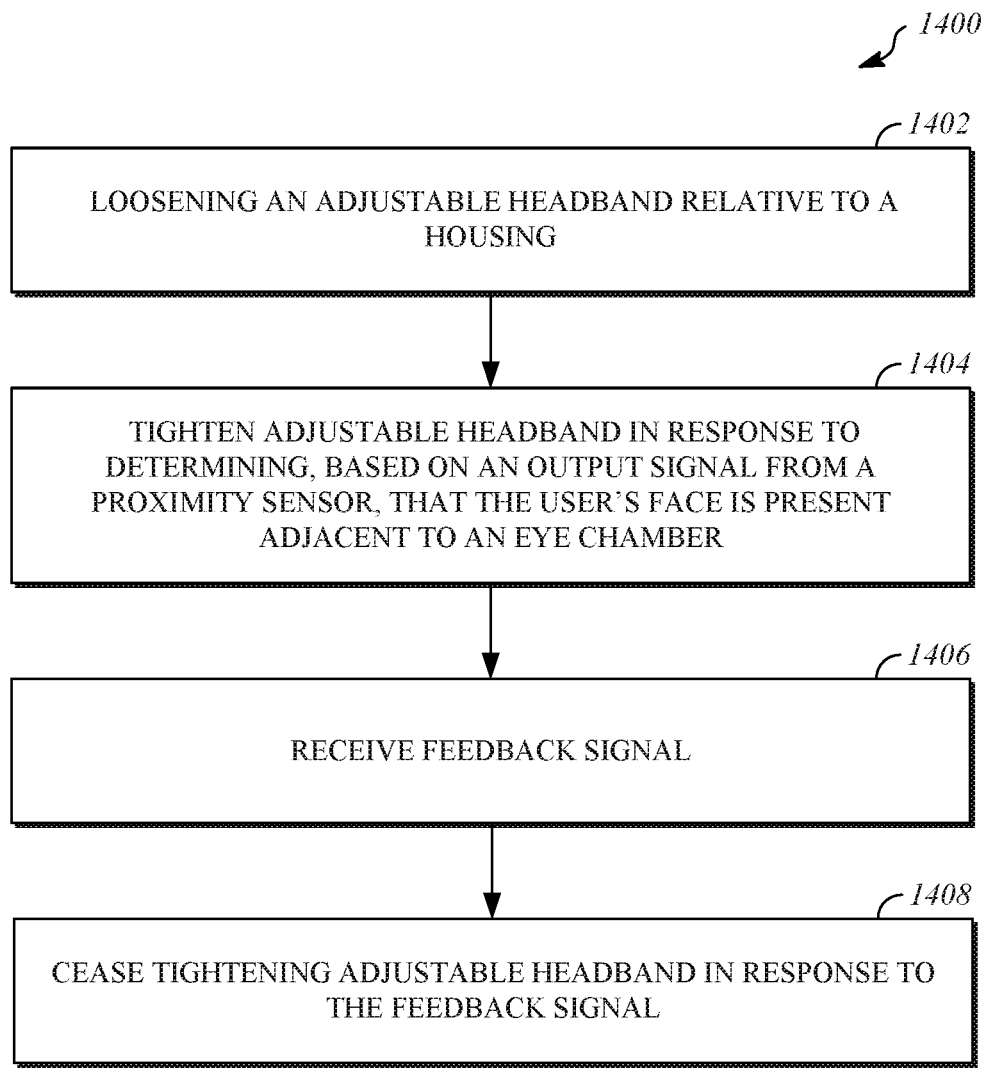
FIG. 14 is a flowchart showing a second example of a process for adjusting a head-mounted display.

FIG. 14 is a flowchart that shows a first example of a process 1400 for adjusting a head-mounted display. In the process 1400, tightening commences when the user's face is present adjacent to the eye chamber. The process 1400 can be implemented, for example, using the head-mounted display 100, the head-mounted display 500, the head-mounted display 700, the head-mounted display 1000, and the head-mounted display 1100. The process 1400 may also be implemented using the electronic components 1200. Some of the operations are performed using a computing device. One example of a computing device includes a processor, a memory, and computer-executable program instruction that are stored in the memory and can be executed by the processors to perform the operations that are described herein. The computing device may include the processor 1202 and the memory 1204 of the electronic components 1200.

Operation 1402 includes obtaining a loosening an adjustable headband relative to a housing. In operation 1402, a proximity sensor, such as the proximity sensor 1226, may indicate that the user's face is not present adjacent to an eye chamber of the head-mounted display. In operation 1404, tightening of the head-mounted display commences in response to determining, based on the output signal from the proximity sensor, that the user's face is now present adjacent to the eye chamber of the head-mounted display. In operation 1406, a feedback signal is received, indicating that the adjustable headband has been tightened appropriately. In operation 1408, in response to the feedback signal received in operation 1406, tightening of the adjustable headband ceases.

Figure 15:
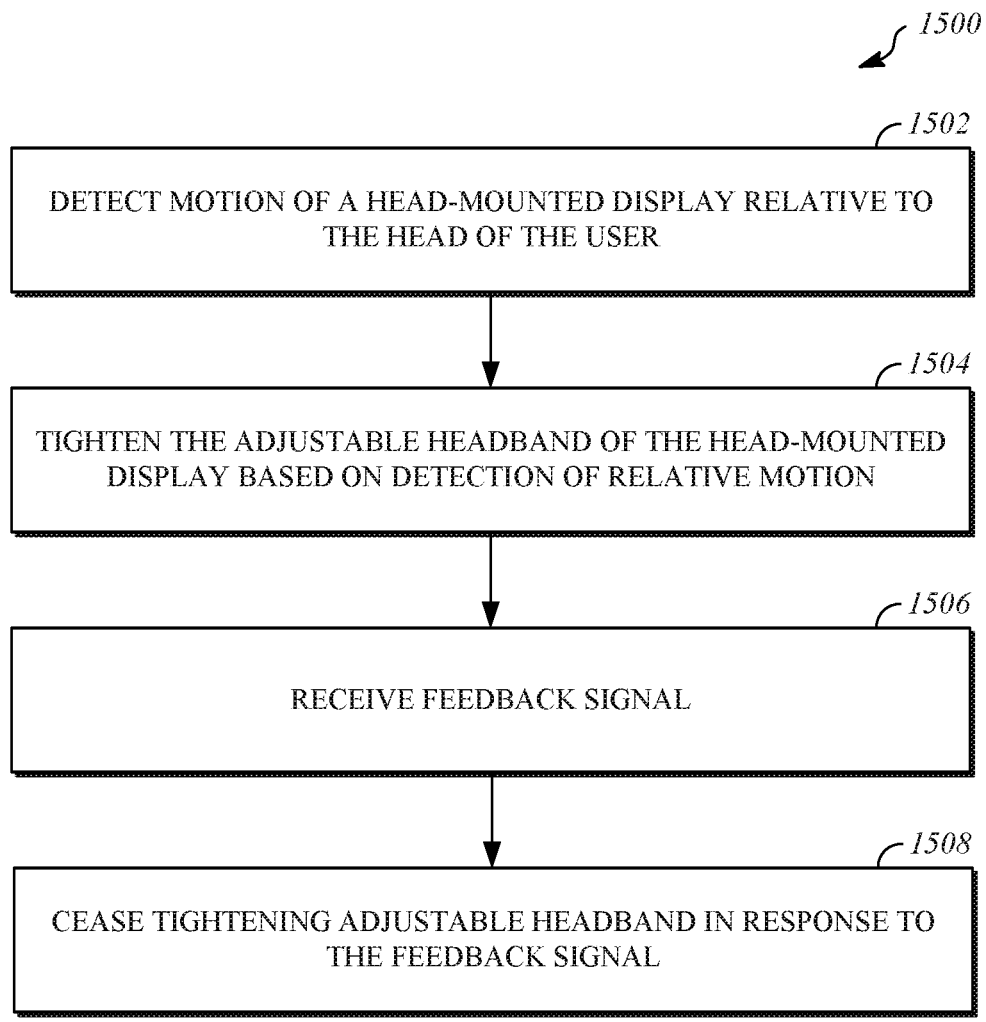
FIG. 15 is a flowchart showing a third example of a process for adjusting a head-mounted display.

FIG. 15 is a flowchart that shows a first example of a process 1500 for adjusting a head-mounted display. In the process 1500, an adjustable headband of a head-mounted display is tightened in response to detecting motion of the head-mounted display relative to the user's head. The process 1500 can be implemented, for example, using the head-mounted display 100, the head-mounted display 500, the head-mounted display 700, the head-mounted display 1000, and the head-mounted display 1100. The process 1500 may also be implemented using the electronic components 1200. Some of the operations are performed using a computing device. One example of a computing device includes a processor, a memory, and computer-executable program instruction that are stored in the memory and can be executed by the processors to perform the operations that are described herein. The computing device may include the processor 1202 and the memory 1204 of the electronic components 1200.

Operation 1502 includes detecting motion of the head-mounted display relative to the head of the user. Motion may be detected, for example, by measuring movement of the position of the user's eyes relative to the head-mounted display using an eye position sensor, such as the eye tracking sensor 1228. Other sensing devices may be used to detect relative motion, such as, for example, a visible spectrum camera located on the outside of the housing of the head-mounted display. Operation 1504 includes tightening of the adjustable headband of the head-mounted display based on detection of relative motion in operation 1502. For example, operation 1504 may be performed in response to determining that the relative motion detected in operation 1502 exceeds a threshold value. In operation 1506, a feedback signal is received, indicating that the adjustable headband has been tightened appropriately. In operation 1508, in response to the feedback signal received in operation 1506, tightening of the adjustable headband ceases.

Figure 16:
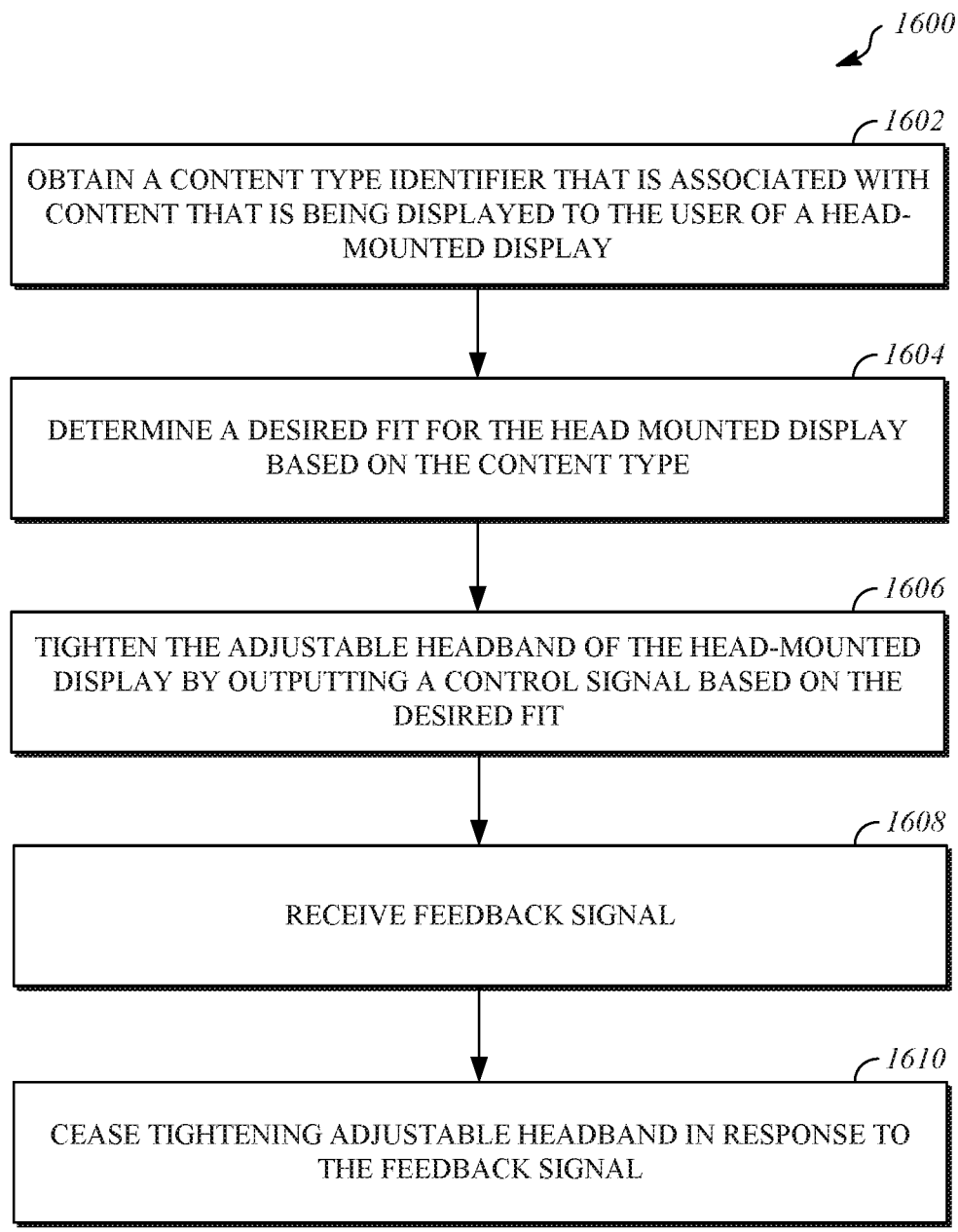
FIG. 16 is a flowchart showing a fourth example of a process for adjusting a head-mounted display.

FIG. 16 is a flowchart that shows a first example of a process 1600 for adjusting a head-mounted display. In the process 1600, tightening of an adjustable headband of a head-mounted display is controlled based in part on the type of content being displayed to the user, to allow adjustment to a looser fit when the content is associated with low levels of user motion (e.g., a movie), and to allow adjustment to a tighter fit when the content is associated with high levels of user motion. The type of content can be determined based on identifying information, referred to herein as a content type identifier, that is associated with the content. The process 1600 can be implemented, for example, using the head-mounted display 100, the head-mounted display 500, the head-mounted display 700, the head-mounted display 1000, and the head-mounted display 1100. The process 1600 may also be implemented using the electronic components 1200. Some of the operations are performed using a computing device. One example of a computing device includes a processor, a memory, and computer-executable program instruction that are stored in the memory and can be executed by the processors to perform the operations that are described herein. The computing device may include the processor 1202 and the memory 1204 of the electronic components 1200.

Operation 1602 includes obtaining a content type identifier that is associated with content that is being displayed to the user of the head-mounted display. The content type identifier may be associated with the content. As one example, the content type identifier can be a value such as a flag that is set by a content creator or other party. As another example, the content type identifier can be determined using logic, such as by analyzing the source of the content (e.g., a media player versus a game application) or by monitoring types of user input, such as inputs from controllers or motion-based inputs relative to the content. Operation 1604 includes determining a desired fit for the head-mounted display based on the content type. As an example, the desired fit may be expressed as a value representing tightness (a "tightness value"), with a first content type being associated with a lower tightness value than a second content type.

Operation 1606 includes tightening of the adjustable headband of the head-mounted display by outputting a control signal based on the desired fit determined in operation 1604. In operation 1608, a feedback signal is received, indicating that the adjustable headband has been tightened appropriately. In operation 1610, in response to the feedback signal received in operation 1608, tightening of the adjustable headband ceases.

As described above, one aspect of the present technology is the gathering and use of data available from various sources to improve adjustment of head-mounted devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to store settings that allow automatic adjustment of a head-mounted device when it is worn by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of head-mounted device adjustment, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, adjustment settings can be determined each time the device is used.

What is claimed is:

1. A head-mounted display to be worn by a user, comprising:
   a housing;
   a headband configured to secure the housing to a head of the user;
   a hand presence sensor configured to detect a hand of the user; and
   an adjustment mechanism configured to:
      loosen the headband relative to the housing in response to a first output signal from the hand presence sensor, the first output signal representing that the hand of the user is detected by the hand presence sensor; and
      tighten the headband relative to the housing in response to a second output signal from the hand presence sensor, the second output signal representing that the hand of the user has ceased being detected by the hand presence sensor.

2. The head-mounted display of claim 1, wherein the hand presence sensor is a first hand presence sensor configured to detect a first hand of the user, and wherein the head-mounted display includes a second hand presence sensor configured to detect a second hand of the user.

3. The head-mounted display of claim 2, wherein the first hand presence sensor is disposed on a first side of the housing and the second hand presence sensor is disposed on a second side of the housing.

4. The head-mounted display of claim 2, wherein the adjustment mechanism is configured to loosen the headband when respective first output signals from the first and second hand presence sensors indicate that the first and second hands of the user are detected.

5. The head-mounted display of claim 4, wherein the adjustment mechanism is configured to tighten the headband when respective second output signals from the first and second hand presence sensors indicate that one of the first and second hands of the user has ceased being detected.

6. The head-mounted display of claim 1, further comprising:
   an eye chamber disposed in the housing; and
   a proximity sensor disposed in the eye chamber,
      wherein the adjustment mechanism is operable to change a tightness of the headband relative to the housing in response to a third output signal from the proximity sensor representing whether a face of the user is present adjacent to the eye chamber.

7. The head-mounted display of claim 1, wherein the adjustment mechanism includes a variable volume structure that changes the tightness of the headband relative to the head of the user by expansion or contraction.

8. The head-mounted display of claim 7, wherein the variable volume structure includes at least one of shape-memory alloy wires that move between contracted and expanded positions or an internal bladder that inflates and deflates between contracted and expanded positions.

9. A head-mounted display to be worn by a user, comprising:
   a housing including an eye chamber to be positioned adjacent to eyes of the user;
   a proximity sensor located in the eye chamber;
   a headband configured to secure the housing to a head of the user; and
   an adjustment mechanism operable to:
      change a tightness of the headband relative to the housing in response to an output signal from the proximity sensor, the output signal representing whether a face of the user is present adjacent to the eye chamber; and change the tightness of the headband relative to the housing in response to output signals from hand presence sensors, the output signals representing that both hands of the user are detected by the hand presence sensors.

10. The head-mounted display of claim 9, wherein the adjustment mechanism includes a variable volume structure that changes the tightness of the headband relative to the head of the user by expansion or contraction.

11. The head-mounted display of claim 10, wherein the variable volume structure includes at least one of shape-memory alloy wires that move between contracted and expanded positions and an internal bladder that inflates and deflates between contracted and expanded positions.

12. The head-mounted display of claim 9, further comprising:
a force sensor in contact with the headband,
wherein the adjustment mechanism is operable to change the tightness of the headband relative to the housing in response to an output signal from the force sensor, the output signal from the force sensor representing a tightness level of the headband relative to the head of the user.

13. The head-mounted display of claim 9, further comprising:
a motion tracking system,
wherein the adjustment mechanism is operable to change the tightness of the headband relative to the housing in response to an output signal from the motion tracking system, the output signal from the motion tracking system representing motion of the head-mounted display relative to the head of the user.

14. The head-mounted display of claim 9, wherein the adjustment mechanism includes a motor, and wherein the adjustment mechanism is operable to change the tightness of the headband relative to the housing in response to an output signal from the motor, the output signal of the motor representing a current draw of the motor.

15. The head-mounted display of claim 14, wherein the headband includes at least one of a strap that is extendable and retractable by operation of the motor or a first part and a second part that are interconnected by a gear rack to loosen or tighten the first part and the second part relative to each other by operation of the motor.

16. A head-mounted display, comprising:
a housing including an eye chamber to be positioned adjacent to eyes of a user;
a headband configured to secure the housing to a head of the user;
a motion tracking system that is operable to measure relative motion between the housing and the eyes of the user;
hand presence sensors on sides of the housing; and
an adjustment mechanism operable to:
increase a tightness of the headband relative to the housing in response to an output signal from the motion tracking system, the output signal representing relative motion between the housing and the eyes of the user above a threshold value; and
loosen the headband relative to the housing in response to output signals from the hand presence sensors, the output signal representing that both hands of the user are detected by the hand presence sensors.

17. The head-mounted display of claim 16, wherein the adjustment mechanism is operable to increase a tightness of the headband relative to the housing in response to an output signal from one of the hand presence sensors, the output signal representing that a hand of the user ceases being detected by the respective one of the hand presence sensors.

18. The head-mounted display of claim 16, wherein the adjustment mechanism is operable to tighten the headband when the output signal indicates that a single hand of the user is detected by one of the hand presence sensors.

19. The head-mounted display of claim 16, wherein the adjustment mechanism includes a motor, and wherein the adjustment mechanism is operable to change the tightness of the headband relative to the housing in response to an output signal from the motor, the output signal of the motor representing a current draw of the motor.

20. The head-mounted display of claim 16, wherein the adjustment mechanism is operable to change a tightness of the headband relative to the housing in response to an output signal from a proximity sensor representing whether a face of the user is present adjacent to the eye chamber.

\* \* \* \* \*